(12) United States Patent
Manhart (10) Patent No.: US 12,488,429 B2
(45) Date of Patent: Dec. 2, 2025

(54) COMPUTER-IMPLEMENTED METHOD FOR DETERMINING A SUBTRACTION IMAGE, IMAGE RECORDING FACILITY, COMPUTER PROGRAM, AND ELECTRONICALLY READABLE DATA CARRIER

(71) Applicant: Siemens Healthineers AG, Forchheim (DE)

(72) Inventor: Michael Manhart, Fürth (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 18/772,258

(22) Filed: Jul. 14, 2024

(65) Prior Publication Data

US 2025/0022104 A1 Jan. 16, 2025

(30) Foreign Application Priority Data

Jul. 14, 2023 (DE) ..................... 10 2023 206 729.3

(51) Int. Cl.
*G06T 5/50* (2006.01)
*G06T 5/60* (2024.01)
*G06T 5/73* (2024.01)

(52) U.S. Cl.
CPC ................. *G06T 5/50* (2013.01); *G06T 5/60* (2024.01); *G06T 5/73* (2024.01);
(Continued)

(58) Field of Classification Search
None
See application file for complete search history.

(56) References Cited

U.S. PATENT DOCUMENTS 10,869,644 B2 * 12/2020 Zhao ..................... A61B 6/032
2010/0067772 A1 3/2010 Kitamura
(Continued)

FOREIGN PATENT DOCUMENTS

CN 106875354 A 6/2017
CN 113795197 A 12/2021
(Continued)

OTHER PUBLICATIONS

Boland, Natashia L. "A dual-active-set algorithm for positive semi-definite quadratic programming." Mathematical Programming 78.1 (1996): 1-27.
(Continued)

*Primary Examiner* — Jiangeng Sun
(74) *Attorney, Agent, or Firm* — Lempia Summerfield Katz LLC (57) ABSTRACT

A computer-implemented method for determining a subtraction image from a feature image and a plurality of mask images of an imaging area of an examination object is provided. A combination of the plurality of mask images weighted by mask weights is subtracted from the feature image to determine the subtraction image. The mask weights are determined in an optimization process for optimizing an image quality function for test images calculated by subtracting a combination of the mask images determined with a test set of mask weights from the feature image. The image quality function is minimized in the form of a convex quadratic program of a dimension corresponding to the number of mask images.

16 Claims, 3 Drawing Sheets

(52) U.S. Cl.
CPC .............. *G06T 2207/20081* (2013.01); *G06T 2207/20192* (2013.01); *G06T 2207/20224* (2013.01); *G06T 2207/30101* (2013.01)

(56) References Cited

U.S. PATENT DOCUMENTS

| | | | |
|---|---|---|---|
| 2013/0004052 A1* | 1/2013 | Chen ...................... | G06T 7/251 382/132 |
| 2015/0022698 A1* | 1/2015 | Na ......................... | H04N 23/635 348/241 |
| 2018/0082420 A1* | 3/2018 | Brown ................... | G06T 7/0016 |
| 2018/0279983 A1 | 10/2018 | Ohishi | |
| 2018/0374204 A1* | 12/2018 | Manhart ................. | G06T 3/14 |
| 2020/0273217 A1 | 8/2020 | Kaethner et al. | |
| 2022/0230368 A1 | 7/2022 | Zannoli et al. | |
| 2023/0037260 A1 | 2/2023 | Manhart | |
| 2023/0169668 A1* | 6/2023 | Yang ....................... | G06T 7/11 382/128 |
| 2024/0289924 A1* | 8/2024 | Yue ......................... | G06V 10/761 |
| 2024/0320842 A1 | 9/2024 | Manhart | |

FOREIGN PATENT DOCUMENTS

| | | | | |
|---|---|---|---|---|
| DE | 102019202514 | A1 | | 8/2020 |
| DE | 102021208272 | A1 | | 2/2023 |
| JP | 2009152779 | A | * | 7/2009 |
| JP | 2011010243 | A | * | 1/2011 |
| JP | 2017068302 | A | * | 4/2017 ............... G06T 3/00 |

OTHER PUBLICATIONS

Goldfarb, Donald, and Ashok Idnani. "A numerically stable dual method for solving strictly convex quadratic programs." Mathematical programming 27.1 (1983): 1-33.
Hansen, Per Christian. "The L-curve and its use in the numerical treatment of inverse problems." (1999): 119-142.
Waltz, Richard A., et al. "An interior algorithm for nonlinear optimization that combines line search and trust region steps." Mathematical programming 107.3 (2006): 391-408.
Decision to Grant German App. No. DE 10 2024 205 602.2 mailed Nov. 4, 2024, with English translation.
Examination Report for German App. No. DE 10 2024 205 602.2 mailed Oct. 15, 2024, with English translation.
Wang Beliun et al.; "Machine Learning"; Nov. 30, 2021; Southeast University Press; pp. 1-15.
Gu, Shuhang, et al. "Weighted nuclear norm minimization and its applications to low level vision." International journal of computer vision 121.2 (2017): 183-208.

* cited by examiner

COMPUTER-IMPLEMENTED METHOD FOR DETERMINING A SUBTRACTION IMAGE, IMAGE RECORDING FACILITY, COMPUTER PROGRAM, AND ELECTRONICALLY READABLE DATA CARRIER

This application claims the benefit of German Patent Application No. DE 10 2023 206 729.3, filed on Jul. 14, 2023, which is hereby incorporated by reference in its entirety.

BACKGROUND

The present embodiments relate to determining a subtraction image from a feature image and a plurality of mask images of an imaging area of an examination object.

In medical imaging, there are applications in which a subtraction image is subtracted from a feature image showing the feature to be displayed by subtracting a mask image containing an anatomical background, for example, in order to better display certain features. A main, known application is digital subtraction angiography, in which the imaging area of the examination object (e.g., a patient) is recorded without any contrast medium present in order to obtain a mask image, and in which the feature image, also referred to as the filling image, shows the imaging area with a contrast medium. In a patient, the contrast medium is introduced into the vascular system so that the subtraction image shows the blood vessels of the patient.

In such imaging methods, movements of the examination object (e.g., the patient) may occur between the recording of the mask image and the recording of the feature image. Such movements include, for example, macroscopic, conscious patient movements as well as cyclical physiological movements (e.g., due to the heartbeat and/or breathing). As a result, image content may be shifted between the mask image and the feature image, so that errors may occur in the subtraction image. Differences in noise between the mask image and the feature image are another problem. This may lead to noise amplification effects and the like.

In order to be able to respond to these problems, the recording of a series of mask images rather than one mask image was proposed. For noise reduction, it may then be provided, for example, to average the mask images, which, however, is not expedient for movements of the examination object. It was therefore also proposed to determine and subtract from the feature image an optimal, weighted combination of the mask images (e.g., with regard to the state of movement in the feature image), which is formed by a sum formed with mask weights.

DE 10 2021 208 272 A1 discloses a method for generating a subtraction image for digital subtraction angiography. In this process, mask images that show the object in its natural state when the contrast medium has not yet spread in the object (e.g., in vessels) are obtained. The mask images contain contours that reflect the structure of the object but are of little or no importance for the examination. After a contrast medium has been administered to the examination object, an image (e.g., the feature image) of the examination object that reproduces the effects of the spreading contrast medium is obtained. There it is now proposed to form a first total image from the plurality of mask images by summing the plurality of mask images in each case multiplied by an individual mask weight. The individual mask weights for each mask image of the plurality of mask images are determined automatically by an optimization method. The optimization method uses a suitable quality measure (e.g., an image quality function). The quality measure may be an energy, a total variation, or a Softplus function.

Specifically, in such approaches, it may be provided, for example, that the optimization problem is solved by an "interior point" algorithm (see, for example, Richard A. Waltz et al., "An interior algorithm for nonlinear optimization that combines line search and trust region steps," Mathematical Programming 107.3 (2006): 391-408). In general, such algorithms are not real-time capable, as would be desirable for fluoroscopy applications, for example. In addition, the available algorithms are extremely complicated implementations that require significant development effort for the respective products.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a robust and efficient way of determining optimum mask weights that may be implemented in real time is provided.

In a computer-implemented method of the type mentioned at the outset, it is provided according to the present embodiments that the image quality function is minimized in the form of a convex quadratic program of a dimension corresponding to the number of mask images.

For example, the examination object may be a human or animal patient or an examination phantom. The mask images and the feature image may be recorded using a medical image recording facility (e.g., an X-ray facility and/or a magnetic resonance facility). The mask images do not show the feature to be displayed in the subtraction image (e.g., a contrast medium). The mask images may be recorded before or after the feature image with the image recording facility (e.g., if the feature is not present in the imaging area of the examination object). The feature image, the mask images, and the subtraction image may be two-dimensional or three-dimensional. In one embodiment, the method is carried out with a control facility controlling the image recording facility that may also control the image recording of the mask images and the feature image. In this case, the recording processes for the feature image and the mask images do not necessarily have to form part of the method; in any case, it may be provided that the mask images and the feature image are made available in the control facility (or another computing facility carrying out the method) via at least one interface.

In an embodiment, it may be provided that the method is carried out in the context of digital subtraction angiography. It may then be provided that the feature image is a filling image of a digital subtraction angiography with a contrast medium. The mask images are recorded when no contrast medium is present in the imaging area (e.g., before the administration of contrast medium). The feature image is recorded after the administration of the contrast medium. The administration of the contrast medium does not form part of the method according to the present embodiments.

In this case, the feature image is therefore a filling image after prior administration of contrast medium. In other words, the filling image shows contrast medium in the imaging area that is to be extracted as a feature by subtraction. In this case, the contrast medium may be introduced into the vascular system of a patient so that the blood vessels filled with contrast medium may be recognized particularly easily in the subtraction image. For example, a method for determining a subtraction image of digital subtraction angiography from a feature image that is configured as a filling image, and a plurality of mask images of an imaging area of an examination object is provided. A combination of mask images weighted by mask weights is subtracted from the feature image to determine the subtraction image. The mask weights are determined in an optimization process for optimizing an image quality function for test images calculated by subtracting a combination of the mask images determined with a test set of mask weights from the feature image that is characterized in that the image quality function is minimized in the form of a convex quadratic program of a dimension corresponding to the number of mask images.

Generally speaking, an optimization process is also used in the context of the present embodiments to determine mask weights for the determination of a total image (e.g., the combination of mask images). This optimization process ultimately serves to find an optimal trade-off between noise reduction and movement artifact reduction by optimizing an image quality metric described by the image quality function. For a test set of mask weights, test images are calculated by subtracting a total image using the test set from the feature image, and the image quality function is calculated for each of these test images. The result is minimized or maximized, depending on the image quality metric. In this way, temporal interpolation between mask images is implicitly enabled in the context of the reduction of motion artifacts, for example.

In contrast to the prior art, however, the optimization problem may be converted into a quadratic program that allows the computational effort to be reduced by a factor of 100 to 1000 by reducing the dimensionality to the number of mask images. At the same time, a robust determination of optimal mask weights is still possible. This provides a highly efficient way of solving the mask image weighting problem. The optimization problem is transferred to a low-dimensional quadratic program that may be solved with less computational effort. There are already freely available solutions for quadratic programs, so that the effort required for concrete implementation is also significantly reduced. For example, the creation of a general algorithm for solving non-linear constrained problems that is efficient in terms of computing time is avoided. Experiments have shown that the approach according to the present embodiments allows mask weights to be determined in a robust manner in a very low, real-time-compatible calculation mode (e.g., on laptop computers as computing facilities).

In an embodiment, an L2 standard (e.g., a weighted L2 standard) is used as the image quality function. This L2 standard of the respective test images is to be minimized in the optimization process. In one embodiment, the quadratic program may be formulated by multiplying the subtraction terms for the test images and separating the quadratic and linear terms in a vector of the mask weights.

In the following, P is the number of pixels in the mask images, M is the feature image F, S is the subtraction image, and N is the number of mask images, s, f, and $m_k$ are the vectorized subtraction, feature, and mask images (e.g., each with P real-valued entries, the image values). The mask weight for the i-th mask image is $\alpha_i$, each mask weight is at an interval of 0 to 1, and the sum of the mask weights is 1. Further, W is a weight matrix that is the unit matrix in the case of an unweighted L2 standard, and a diagonal matrix of the dimension P×P in the case of a weighted L2 standard, the diagonal of which contains the corresponding standard weights $w_i$ (e.g., for each pixel i). The optimization problem may then be written as $$\alpha = \mathrm{argmin}\left(f - \sum_i \alpha_i m_i\right)^T W\left(f - \sum_i \alpha_i m_i\right) \text{ s.t. } \sum_i \alpha_i = 1 \quad \text{(Equation 1)}$$
$$0 \leq \alpha_i \leq 1$$

M is a P×N matrix containing the vectorized mask images $m_i$ as columns M=($m_1 \ldots m_N$), and $\alpha$ is the vector of the mask weights $\alpha_i$ with M entries. It follows:

$$\alpha = \mathrm{argmin}\, (M\alpha - f)^T W(M\alpha - f) \text{ s.t. } \sum_i \alpha_i = 1 \quad (2)$$
$$0 \leq \alpha_i \leq 1$$
$$\alpha = \mathrm{argmin}\, \alpha^T M^T WM\alpha - 2f^T WM\alpha \text{ s.t. } \sum_i \alpha_i = 1 \quad (3)$$
$$0 \leq \alpha_i \leq 1$$

and, with $$Q = M^T WM \in \mathbb{R}^{N \times N} \quad (4)$$

and $$c = \left(-2f^T WM\right)^T \in \mathbb{R}^N.$$

The quadratic program is $$\alpha = \mathrm{argmin}\, \alpha^T Q\alpha + c^T \alpha \text{ s.t. } \sum_i \alpha_i = 1 \quad (5)$$
$$0 \leq \alpha_i \leq 1$$

This quadratic program only includes matrices and vectors of dimensionality N (e.g., the number of mask images). No evaluation of the original images of dimensionality P is required during the optimization process, N being very much smaller than P (e.g., N<<P). The complete images only need to be processed if Q and c are precalculated. By construction, Q is positive (semi-)definite, so that the optimization problem is convex.

For such convex quadratic optimization problems, special algorithms already exist in the prior art that may be executed faster than general algorithms for constrained non-linear optimization. In an embodiment, it may be provided that the optimization process is carried out by a Goldfarb-Idnani method. For example, a "Goldfarb-Idnani active-set dual method" may be used, which is available, for example, in toolboxes referred to as QuadProg. The Goldfarb-Idnani method is basically described in an article by D. Goldfarb and A. Idnani, "A numerically stable dual method for solving strictly convex quadratic programs," Mathematical Programming 27.1 (1983): 1-33. Further, for positive, semi-definite problems, reference is made to the article by N. L. Boland, "A dual-active-set algorithm for positive semi-definite quadratic programming," Mathematical Programming 78 (1996): 1-27.

However, compared to robust image quality functions such as total variation, quadratic norms are more susceptible to outliers. For example, pixels in which there is no attenuation during X-ray imaging or pixels in which metal objects are located may have a great influence on optimization. For example, if the movement patterns of such pixels do not follow the general movement pattern (e.g., if a metallic dental implant is moved independently of the skull in cranial images), the robustness of the determination of the optimal mask weights is affected.

Therefore, in the context of the present embodiments, the L2 standard may be weighted by standard weights for each pixel. The standard weights are determined by an image analysis process of the feature image and the mask images and/or based on additional information. With regard to the formulae shown above, this provides that the matrix W does not correspond to the unit matrix, but rather W=diag(w) with the P standard weights $w_i$ in the vector w. It is therefore proposed to determine and use suitable standard weights w in order to reduce the influence of outlier pixels and/or to focus on certain pixels or areas, for example. With regard to the outliers, automatic determination of the standard weights by image analysis in an image analysis process may be provided, so that a significant increase in robustness may be achieved.

For this purpose, it may be specifically provided that in the image analysis process, maximum deviations of the image values of the feature image from the image values of the mask images are determined for each pixel, and lower standard weights are assigned to at least some of the pixels with the greatest maximum deviations.

As a convex combination of images is optimized, it is possible to calculate the maximum influence of each subtracted pixel on a quadratic error term. Specifically, the maximum error for each pixel p (e.g., of each pixel in two-dimensional images) corresponds to the maximum deviation of the image values f(p) of the feature image from the image values $m_i(p)$ of the mask images, and thus $$e_{max}(p) = \max\bigl((f(p) - m_1(p))^2, \ldots, (f(p) - m_N(p))^2\bigr) \qquad (6)$$

Since the influence of outliers is to be reduced, it is provided that a lower weighting be provided for higher maximum deviations.

Specifically, it may be provided that pixels having a maximum deviation that is above a threshold value are assigned a standard weight of zero and/or at least in a functional range extending around the threshold value. The standard weights are determined according to a monotonically decreasing function. While it may be provided that, for example, the threshold value is fixed, an embodiment provides that the threshold value is determined based on a histogram analysis of the maximum deviations (e.g., as a value that a predetermined proportion of the maximum deviations exceeds). Thus, a threshold value may be derived by histogram analysis in order to identify outlier image values at certain pixels. For example, the threshold value may correspond to a value of the maximum deviation at which 90 to 99% (e.g., 95%) of the values of the maximum deviations are below this value. The standard weights may be assigned such that $$w(p) = \begin{cases} 1 & \text{if } e_{max}(p) < \tau \\ 0 & \text{otherwise} \end{cases} \qquad (7)$$

where $\tau$ denotes the threshold value. It may be provided that a continuous, monotonically decreasing function (e.g., weighting function) around the threshold value determines the standard weights.

However, embodiments may also provide that the standard weights in the image analysis process are determined at least partially using an image analysis function (e.g., a trained image analysis function). Such image analysis functions may be used, for example, to detect and/or segment metals and/or attenuation-free zones. Such metal areas and/or object-free areas may then, for example, likewise be suppressed by selecting low standard weights or standard weights as zero for optimization.

For example, the use of trained image analysis functions that have been trained by machine learning lends itself here. For example, with regard to the detection and/or segmentation of metals in image data, trained image analysis functions have already been proposed in the prior art that may also be used advantageously in the context of the present embodiments.

In general, a trained function maps cognitive functions that humans associate with other human brains. Through training based on training data (e.g., machine learning), the trained function is able to adapt to new circumstances and to detect and extrapolate patterns.

Generally speaking, parameters of a trained function may be adjusted by training. For example, supervised learning, semi-supervised learning, unsupervised learning, reinforcement learning, and/or active learning may be used. In addition, representation learning (also known as "feature learning") may also be used. For example, the parameters of the trained function may be adjusted iteratively by a number of training steps.

A trained function may include, for example, a neural network, a Support Vector Machine (SVM), a decision tree, and/or a Bayesian network, and/or the trained function may be based on k-means clustering, Q-learning, genetic algorithms, and/or mapping rules. For example, a neural network may be a deep neural network, a Convolutional Neural Network (CNN), or a deep CNN. In addition, the neural network may be an Adversarial Network, a deep Adversarial Network, and/or a Generative Adversarial Network (GAN).

As far as the additional information is concerned, it may be provided that the additional information describes a region of interest of the imaging area that is to be weighted higher. In this way, the optimization may be focused on an area of actual interest, it being possible for less interesting parts of the imaging area to be weighted less strongly. The additional information may be derived, for example, from user input (e.g., by the user marking a region of interest). However, automatic derivation may also be provided, for example, based on information that is already available (e.g., on the selection and location of the imaging area and/or with regard to the imaging target). In the case of automatic derivation, a trained derivation function (e.g., artificial intelligence) may also be used.

In a general development, provision may be made for the feature image and the mask images to be preprocessed for the optimization process by an edge sharpening image processing operation. In addition or as an alternative to using weighting, the feature image and the mask images may therefore be preprocessed for the optimization process. In this case, the edges may be reinforced in order to place a higher value on the edges during optimization and thus reduce edge artifacts in an improved manner (e.g., with regard to movement of the examination object). This is particularly advantageous in the context of imaging the head of the patient, as in this way, the optimization process may be better focused on bone edges. In this case, basically known, edge-enhancing filters may be used, but a gradient image may be determined in the image processing operation for the feature image and for each of the mask images, an edge-sharpened feature image is determined by weighted linear combination of the original feature image with the associated gradient image, and edge-sharpened respective mask images are determined by weighted linear combination of the original respective mask image and the associated gradient image. Thus, for both the feature image and the mask images, the corresponding image and the associated gradient image are mixed, which leads to better highlighting of the edges. The improved consideration of edges increases the image quality of the subtraction image due to improved movement consideration.

An embodiment is based on the realization that the weighting carried out using the approach described above may also lead to an increase in the noise level in individual cases, without visibly reducing motion artifacts. This is explained by way of example below.

If $\sigma_0^2$ denotes the noise variance in the unsubtracted single image, then the noise variance in the same averaged mask corresponds to $$\sigma_{M\_a}^2 = \frac{\sigma_0^2}{M} \quad (8)$$

and the noise variance with optimized weights to $$\sigma_{M\_w}^2 = \sigma_0^2 \sum_{i=1}^{M} \alpha_i^2 = \sigma_0^2 \|\alpha\|_2^2 \quad (9)$$

This results in the following for the subtraction image $$\sigma_{S\_a}^2 = \sigma_0^2 \left(1 + \frac{1}{M}\right) \quad (10)$$

or $$\sigma_{S\_w}^2 = \sigma_0^2 (1 + \|\alpha\|_2^2)$$

The increase in noise in the subtraction image is accordingly $$noiseincr = \left(\frac{\sigma_{S\_w}^2}{\sigma_{S\_a}^2} - 1\right) * 100\% = \left(\frac{1 + \|\alpha\|_2^2}{1 + \frac{1}{M}} - 1\right) * 100\% \quad (11)$$

For example, in the case of eight mask images (M=8), in the worst case, when a single mask is given a weight of 1, the noise may be increased by $$noiseincr = \left((1 + 1) / \left(1 + \frac{1}{8}\right) - 1\right) * 100\% = 77.8\% \quad (12)$$

According to the embodiment, in order to avoid this problem, it is proposed that the image quality function includes a regularization of the weights with the aim of counteracting an uneven distribution of the weights.

According to a further embodiment, the regularization is performed as a function of the Euclidean norm of the weights.

As the noise increase is directly proportional to $\|\alpha\|_2^2$, $\|\alpha\|_2^2$ may be used as a regularization term to suppress noise increase. For this purpose, reference may be made to the Tikhonov regularization known from linear regression, which is known from the publication Hansen P. C., "The L-curve and its use in the numerical treatment of inverse problems," Department of Mathematical Modelling, Technical University of Denmark, 1999:

$$\alpha = \operatorname{argmin} \alpha^T Q \alpha + \tilde{\lambda} \|\alpha\|_2^2 + c^T \alpha \text{ s.t. } \sum_i \alpha_i = 1 \quad (13)$$
$$0 \leq \alpha_i \leq 1$$

$$\alpha = \operatorname{argmin} \alpha^T (Q + \tilde{\lambda} I) \alpha + c^T \alpha \text{ s.t. } \overline{\sum}_i \alpha_i = 1 \quad (14)$$
$$0 \leq \alpha_i \leq 1$$

For optimization, a suitable parameter $\tilde{\lambda} \in \mathbb{R}^+$ is to be selected. As the energy in the projection images fluctuates with the dose and therefore also the range of values of Q, $\tilde{\lambda}$ is selected relative to the range of the Euclidean norm of Q, or in the case of complex or real matrices, the Frobenius norm of Q:

$$\tilde{\lambda} = \lambda \|Q\|_F \quad (15)$$

A parameter that is stable for a large number of data sets of stable parameters $\lambda \in \mathbb{R}^+$ may be determined by an L-curve analysis, also known from the previously cited publication by Hansen P. C. In one example case, an L-curve analysis averaged over ~14,000 subtraction images from ~1000 DSA data sets and resulted in a parameter of $\lambda = 10^{-4}$ as advantageous. In the example case, regularization with $\lambda = 10^{-4}$ almost reached the initial noise level during optimization. According to the measurement, the noise increase was reduced from $(92^2/78^2-1)*100\%=39\%$ to 2.5% with this regularization. This corresponded with the estimate according to Equation 11, which resulted in a reduction from 36% to 3%.

In principle, the method according to the present embodiments may be carried out by a general computing facility when the feature image and the mask images are provided. However, this computing facility may be provided as a control facility of the image recording facility with which the feature image and the mask images are recorded.

In addition to the method, the present embodiments therefore also relate to an image recording facility, having a control facility that includes: a recording unit for controlling the recording of a plurality of mask images and a feature image of an imaging area of an examination object; a determination unit for determining a subtraction image by subtracting a combination of the mask images weighted by mask weights from the feature image; and an optimization unit for determining the mask weights in an optimization process for optimizing an image quality function for test images calculated by subtracting a combination of the mask images determined with a test set of mask weights from the feature image. The optimization unit for optimizing the image quality function is configured in the form of a convex quadratic program of a dimension corresponding to the number of mask images.

The control facility may have a processor and a storage device and, in other words, is configured to carry out a method according to the present embodiments. All embodiments relating to the method according to the present embodiments may be transferred analogously to the image recording facility according to the present embodiments, with which the advantages already mentioned may therefore also be obtained. Functional units of the control facility may be implemented by hardware and/or software. Further functional units for implementing further acts may also be realized (e.g., a standard weight determination unit for determining standard weights and/or a pre-processing unit for edge sharpening image processing).

The image recording facility may be an X-ray facility (e.g., a computed tomography facility or a C-arm X-ray facility). However, other image recording facilities may be equipped accordingly (e.g., a magnetic resonance facility).

A computer program according to the present embodiments may be loaded directly into a storage device of a computing facility (e.g., a control facility of an image recording facility) and has program means that, when the computer program is executed on the computing facility, cause the computing facility to carry out a method according to the present embodiments. The computer program may be stored on an electronically readable data carrier (e.g., a non-transitory computer-readable storage medium) according to the present embodiments. The electronically readable data carrier thus includes control information. The control information includes at least one computer program according to the present embodiments and is configured such that when the data carrier is used in a computing facility (e.g., a control facility of an image recording facility), the computing facility is configured to carry out a method according to the present embodiments. The data carrier may be a non-transient data carrier.

BRIEF DESCRIPTION OF THE DRAWINGS

Further advantages and details of the present invention emerge from the example embodiments described below and with reference to the diagrams. The diagrams show.

DETAILED DESCRIPTION

Figure 1:
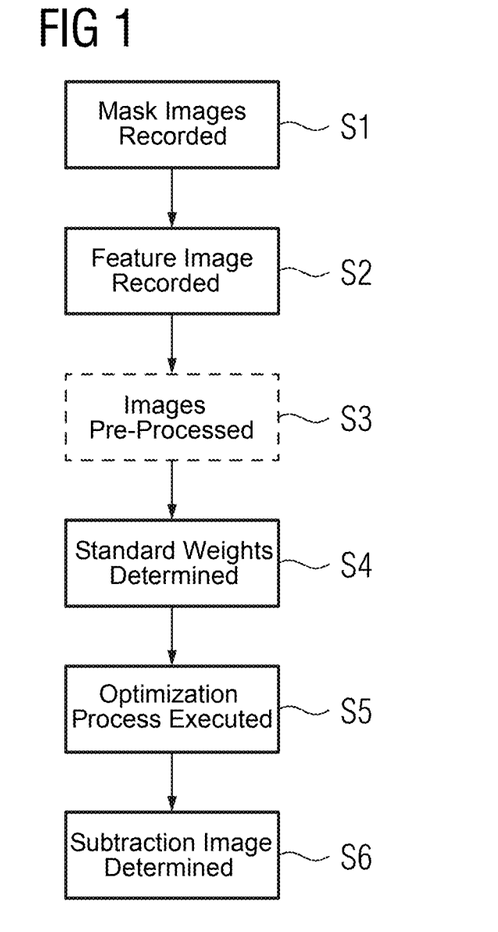
FIG. 1 is a flow chart of an example embodiment of a method.

FIG. 1 shows a flow chart of an example embodiment of a method, and preparatory image recording steps are also shown. In the present case, an example embodiment of digital subtraction angiography using an X-ray facility is described (e.g., for a real-time application, such as in fluoroscopy and/or another application), in which a contrast medium flow in an imaging area of the examination object (e.g., a patient) may be observed, for example, at least substantially in real time. For example, an influx and an outflow of the contrast medium may then also be observed.

In act S1, mask images of the imaging area of the examination object are recorded without contrast medium using an image recording facility (e.g., an X-ray facility). For example, a series of mask images may be recorded over at least one respiratory cycle and/or over at least one cardiac cycle of the patient, depending on the field of application and any movements that may occur.

In act S2, a feature image (e.g., a filling image) of the imaging area is recorded with the image recording facility at a point in time when contrast medium is present in the imaging area (e.g., in blood vessels in the imaging area).

Acts S1 and S2 may also be performed in reverse order (e.g., the mask images may be recorded when the contrast medium has evaporated from the imaging area again). It is also possible to record mask images before and after the feature image.

In an optional act S3, the feature image and the mask images are then pre-processed for a subsequent optimization process. In this case, the mask images and the feature image are subjected to an edge-sharpening image processing operation in order to determine edge-sharpened mask images and an edge-sharpened feature image. The edge-sharpened images are only determined for the optimization process, but not for the subsequent actual determination of the subtraction image, which takes place on the non-edge-sharpened images. Edge sharpening is used to improve the focus of the subsequent optimization process on the edges in order to better avoid movement artifacts in this regard. Specifically, in this example embodiment, a gradient image is determined for each of the images, and the edge-sharpened respective image is determined by the weighted linear combination of the original image with the respective associated gradient image. The use of act S3 is particularly advantageous for head recordings and thus existing bone edges.

In act S4, standard weights are determined for a weighted L2 standard used as an image quality function (e.g., by image analysis). For this purpose, maximum deviations are first determined according to the formula (6). A histogram analysis of the maximum deviations is then performed in order to determine a threshold value. For example, the threshold value may be determined such that 5% of the maximum deviations are above and 95% of the maximum deviations are below. Alternatively, the threshold value may also be fixed. In the present case, while the standard weights of pixels having maximum deviations that are above the threshold value are set to zero, and all other standard weights of pixels are set to one (e.g., formula (7)), a continuous weighting function around the threshold value may also be used to define the standard weights.

In other example embodiments, the standard weights may also be determined at least partially based on the result of a trained image analysis function. For example, the trained image analysis function may segment metal objects and/or free spaces and weight the pixels of the segmented areas low or even set their standard weights to zero. Additional information may also be taken into account (e.g., additional information describing a region of interest (ROI)) in order to assign higher standard weights to the pixels of this region of interest and thus focus the optimization process on them.

In act S5, the optimization process then takes place in order to determine optimal mask weights from which a suitable total image of the mask images to be subtracted from the feature image may be determined. In one embodiment, the optimization is based on the quadratic program according to the formula (5). Q and c (e.g., formula (4)) are calculated in advance. The standard weights from act S4 are used before the actual optimization is performed according to a Goldfarb-Idnani method. For test sets of mask weights, test images are determined and evaluated by the weighted L2 standard as an image quality metric.

In act S6, a subtraction image is then determined as the result by subtracting a total image from the feature image (e.g., original, non-edge-sharpened). The total image is the total of the mask images (e.g., original, non-edge-sharpened) determined using the optimum mask weights of act S5. The result is a high-quality, fast, and robust subtraction image showing the feature (e.g., the contrast medium).

Figure 2:
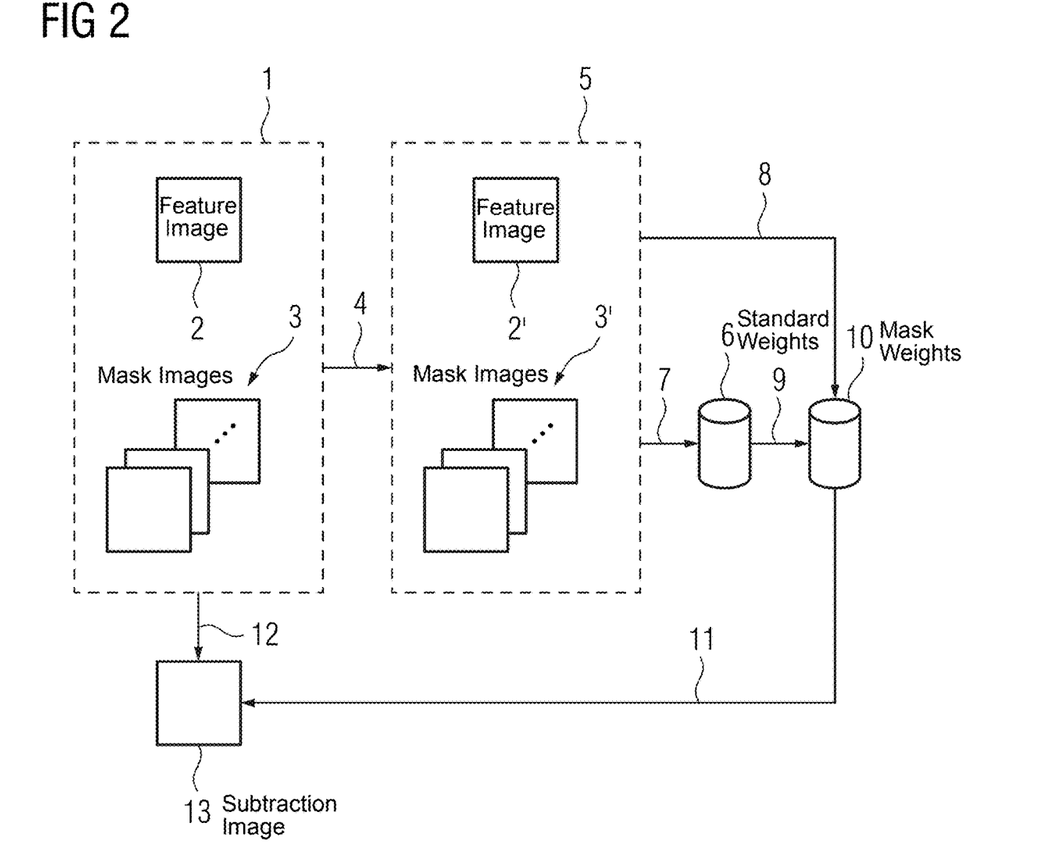
FIG. 2 is a sketch to explain processing measures of the method.

FIG. 2 explains in a diagrammatic view the processing acts within the scope of the method. In acts S1 and S2, an original image set 1 with the feature image 2 and the mask images 3 is obtained. According to the arrow 4 symbolizing act S3, an image set 5 with an edge-sharpened feature image 2' and edge-sharpened mask images 3' is then determined. This now forms the basis for determining the standard weights 6 (e.g., see the arrow 7 symbolizing the act S4). Using the image set 5 and the standard weights 6, the optimum set of mask weights 10 that minimizes the L2 standard weighted with the standard weights 6 is then determined in the optimization process (e.g., see the arrows 8 and 9 symbolizing the act S5). Finally, the mask weights 10 and the image set 1 are used in the subtraction act S6 symbolized by the arrows 11 and 12 to determine the subtraction image 13.

Figure 3:
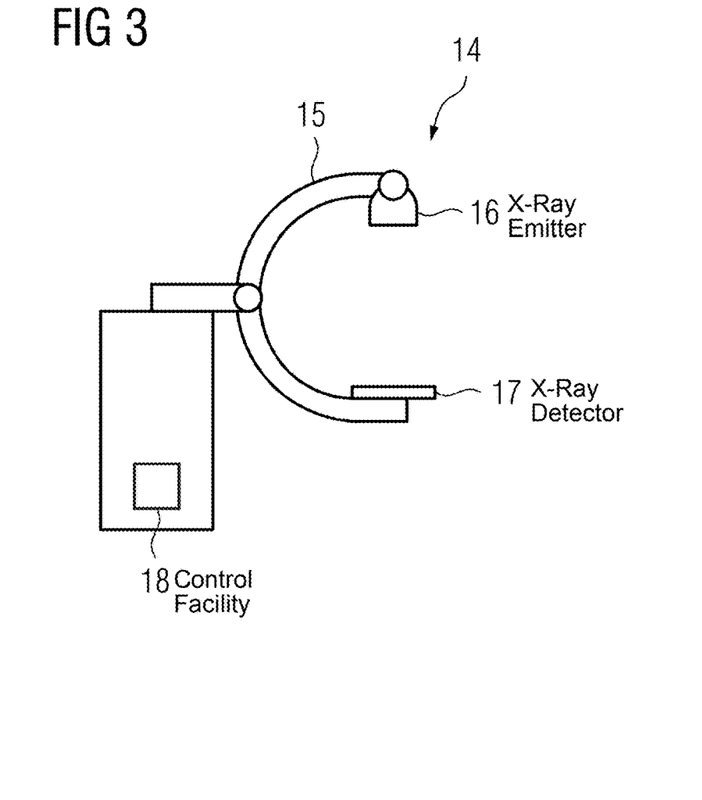
FIG. 3 is a diagrammatic sketch of an image recording facility according to an embodiment.

FIG. 3 shows a diagrammatic view of an image recording facility 14 according to the present embodiments, which, in the present case, is configured as an X-ray facility with a C-arm 15. An X-ray emitter 16 and an X-ray detector 17 are arranged on the C-arm, opposite one another. The C-arm 15 may be moved in order to adjust various projection geometries. The operation of the image recording facility 14 is controlled by a control facility 18 that is also configured to carry out the method according to the present embodiments.

Figure 4:
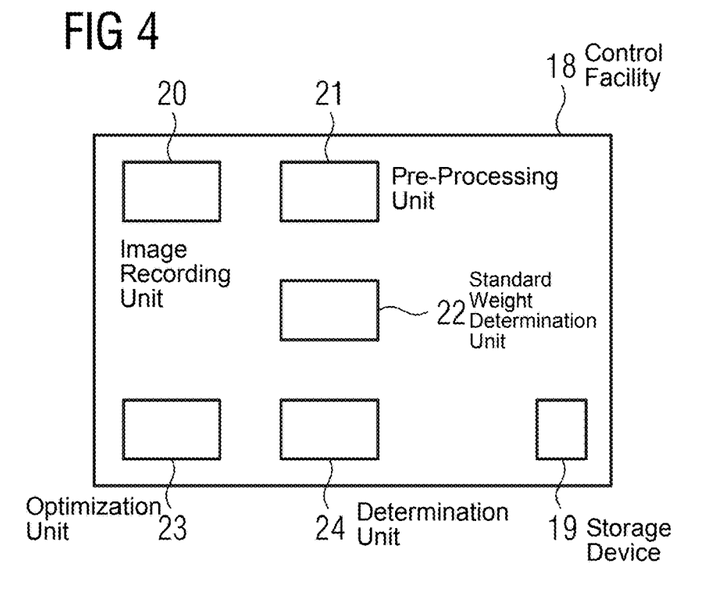
FIG. 4 shows functional structure of a control facility of the image recording facility.

The functional structure of the control facility 18 is shown in more detail in FIG. 4. In addition to a storage device 19, the control facility 18 initially has, as is generally known, an image recording unit 20 that is configured to control the image recording operation of the image recording facility 14 (e.g., also to carry out acts S1 and S2).

A pre-processing unit 21 is provided for determining the image set 5 according to act S3. In a standard weight determination unit 22, the standard weights 6 may be determined according to act S4. An optimization unit 23 is configured to carry out the optimization process according to act S5. Finally, a determination unit 24 is also provided for determining the subtraction image 13 according to act S6.

Although the invention is illustrated and described in more detail by the example embodiments, the invention is not limited by the disclosed examples, and other variations may be derived therefrom by a person skilled in the art without departing from the scope of the invention.

Independent of the grammatical term usage, individuals with male, female, or other gender identities are included within the term.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for determining a subtraction image from a feature image and a plurality of mask images of an imaging area of an examination object, the method being computer-implemented and comprising:
    subtracting a combination of the plurality of mask images weighted by mask weights from the feature image, such that the subtraction image is determined,
    wherein the mask weights are determined in an optimization process for optimizing an image quality function for test images calculated by subtracting a combination of the plurality of mask images determined with a test set of mask weights from the feature image, and
    wherein the image quality function is minimized in the form of a convex quadratic program of a dimension corresponding to a number of mask images of the plurality of mask images.

2. The method of claim 1, wherein an L2 standard is used as the image quality function.

3. The method of claim 2, wherein the convex quadratic program is formulated by multiplying subtraction terms for the test images and separating a quadratic term and a linear term in a vector of the mask weights.

4. The method of claim 2, wherein the L2 standard is weighted by standard weights for each pixel,
    wherein the standard weights are determined by an image analysis process of the feature image and the plurality of mask images, based on additional information, or by the image analysis process of the feature image and the plurality of mask images and based on additional information.

5. The method of claim 4, wherein in the image analysis process:
    maximum deviations of image values of the feature image from image values of the plurality of mask images are determined for each pixel; and
    lower standard weights are assigned to at least some of the pixels with the greatest maximum deviations.

6. The method of claim 5, wherein pixels having a maximum deviation that is above a threshold value are assigned a standard weight of zero, the standard weights are determined according to a monotonically decreasing function at least in a functional range extending around the threshold value, or a combination thereof.

7. The method of claim 5, wherein the standard weights in the image analysis process are determined at least partially using a trained image analysis function.

8. The method of claim 4, wherein the additional information describes a region of interest of higher weighting in the imaging area.

9. The method of claim 1, wherein the feature image and the mask images are pre-processed for the optimization process by an edge-sharpening image processing operation.

10. The method of claim 9, wherein in the image processing operation, a gradient image is determined for the feature image and for each of the mask images, and an edge-sharpened respective image is determined by weighted linear combination of the original respective image and the associated gradient image.

11. The method of claim 1, wherein the optimization process is carried out by a Goldfarb-Idnani method.

12. The method of claim 1, wherein the feature image is a filling image of digital subtraction angiography with a contrast medium.

13. The method of claim 1, wherein the image quality function includes a regularization of the weights with the aim of counteracting an uneven distribution of the weights.

14. The method of claim 13, wherein the regularization is performed as a function of the Euclidean norm of the weights.

15. An image recording facility comprising:
a control facility comprising:
   a recording unit configured to control a recording of a plurality of mask images and a feature image of an imaging area of an examination object;
   a determination unit configured to determine a subtraction image, the determination of the subtraction image comprising subtraction of a combination of the mask images weighted by mask weights from the feature image; and
   an optimization unit configured to determine the mask weights in an optimization process for optimizing an image quality function for test images calculated by subtracting a combination of the mask images determined with a test set of mask weights from the feature image,
wherein the optimization unit for optimizing the image quality function is configured in the form of a convex quadratic program of a dimension corresponding to a number of mask images.

16. A non-transitory computer-readable storage medium that stores a computer program having instructions executable by a computing facility to determine a subtraction image from a feature image and a plurality of mask images of an imaging area of an examination object, the instructions comprising:
   subtracting a combination of the plurality of mask images weighted by mask weights from the feature image, such that the subtraction image is determined,
   wherein the mask weights are determined in an optimization process for optimizing an image quality function for test images calculated by subtracting a combination of the plurality of mask images determined with a test set of mask weights from the feature image, and
   wherein the image quality function is minimized in the form of a convex quadratic program of a dimension corresponding to a number of mask images of the plurality of mask images.

* * * * *